US012621027B2

(12) United States Patent
Binotto et al.

(10) Patent No.: US 12,621,027 B2
(45) Date of Patent: May 5, 2026

(54) MULTI-OBJECTIVE OPTIMIZATION OF BEAMFORMING IN DISTRIBUTED EDGE-IOT ENVIRONMENTS

(71) Applicant: International Business Machines Corporation, Armonk, NY (US)

(72) Inventors: Alecio Pedro Delazari Binotto, Munich (DE); Aladin Djuhera, Dachau (DE); Fernando Luiz Koch, Palm Beach Gardens, FL (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 18/616,265

(22) Filed: Mar. 26, 2024

(65) Prior Publication Data

US 2025/0309954 A1      Oct. 2, 2025

(51) Int. Cl.
*H04B 7/06*          (2006.01)
(52) U.S. Cl.
CPC ................................. *H04B 7/0617* (2013.01)
(58) Field of Classification Search
CPC .................................................. H04B 7/0617
See application file for complete search history.

(56) References Cited

U.S. PATENT DOCUMENTS

| | | | |
|---|---|---|---|
| 11,082,115 B2 | 8/2021 | Landis |
| 11,134,402 B1 | 9/2021 | Boyapati |
| 11,728,849 B2 | 8/2023 | Ali |

(Continued)

FOREIGN PATENT DOCUMENTS

| | | | |
|---|---|---|---|
| CA | 2769828 C | 3/2011 | |
| CN | 107872267 A * | 4/2018 | ........... H04B 7/0408 |

(Continued)

OTHER PUBLICATIONS

Ahmed et al., "Deep Reinforcement Learning-Based Adaptive Beam Tracking and Resource Allocation in 6G Vehicular Networks with Switched Beam Antennas", Electronics, 2023, 12, 2294, 30 pages, <https://www.mdpi.com/2079-9292/12/10/2294>.

(Continued)

*Primary Examiner* — Shean Tokuta
(74) *Attorney, Agent, or Firm* — Aaron N. Pontikos

(57)                    ABSTRACT

A method, computer program product, and computer system are provided for optimization of beamforming in distributed edge computing environments. Predicted context information is collected from user equipment. The predicted context information is associated with one or more nodes in wireless communication with the user equipment. A possible best beamforming configuration at a given time interval is calculated for each of the nodes based on the collected predicted context information. A set of top nodes is determined based on the calculated possible best beamforming configuration. Context information is collected from each node in the set of top nodes based on operational parameters associated with each node. A best node is determined from among the set of top nodes based on the collected context information and the operational parameters. A beamforming configuration associated with the best node is adjusted to the calculated possible best beamforming configuration.

20 Claims, 4 Drawing Sheets

(56)               References Cited

U.S. PATENT DOCUMENTS

| | | | | |
|---|---|---|---|---|
| 2013/0017855 A1* | 1/2013 | Hui | ..................... | H04W 16/28 |
| | | | | 455/524 |
| 2020/0314719 A1* | 10/2020 | Tofighbakhsh | ....... | H04W 36/04 |
| 2021/0136178 A1 | 5/2021 | Casey | | |
| 2024/0106512 A1* | 3/2024 | Bali | ................... | H04W 52/242 |
| 2025/0301448 A1* | 9/2025 | Shrivastava | ......... | H04B 7/0617 |
| 2025/0309954 A1* | 10/2025 | Binotto | ............... | H04B 7/0617 |

FOREIGN PATENT DOCUMENTS

| | | | | | |
|---|---|---|---|---|---|
| CN | 109787828 A | * | 5/2019 | | |
| CN | 112929068 B | | 6/2021 | | |
| CN | 113949422 B | | 1/2022 | | |
| JP | 6680676 B2 | * | 4/2020 | .......... | H04B 7/0617 |
| WO | WO-2025151753 A1 | * | 7/2025 | .......... | H04B 17/328 |

OTHER PUBLICATIONS

Guo et al., "Deep Reinforcement Learning and NOMA-based Multi-Objective RIS-assisted IS-UAV-TNs: Trajectory Optimization and Beamforming Design", IEEE Transactions on Intelligent Transportation Systems, Apr. 2023, 15 pages, <https://www.researchgate.net/publication/369923057>.

Kaur et al., "Contextual Beamforming: Exploiting Location and AI for Enhanced Wireless Telecommunication Performance", Cornell University, arXiv 2307.10183v1, Jul. 2, 2023, 21 pages, <https://arxiv.org/pdf/2307.10183.pdf>.

Leng et al., "Multi-Objective Beamforming for Energy-Efficient SWIPT Systems", Proceedings of the 2016 International Conference on Computing, Networking and Communications, Wireless Communications Symposium (ISWCS), Sep. 20-23, 2016, Poznan, Poland, 7 pages, <https://ieeexplore.ieee.org/abstract/document/7440679>.

Ng et al., "Multi-objective beamforming for secure communication in systems with wireless information and power transfer", Proceedings of the 2013 IEEE 24th International Symposium on Personal, Indoor and Mobile Radio Communications: Fundamentals and PHY Track (PIMRC), Sep. 8-11, 2013, London, UK, 6 pages, <https://ieeexplore.ieee.org/abstract/document/6666095>.

Sun et al., "Improving Performance of Distributed Collaborative Beamforming in Mobile Wireless Sensor Networks: A Multi-objective Optimization Method", IEEE Internet of Things Journal, DOI 10.1109/JIOT.2020.2983519, Jun. 29, 2020, Printed Feb. 18, 2024, 16 pages, <https://ieeexplore.ieee.org/document/9047915>.

Wu et al., "Robust Multi-Objective Beamforming Design for Power Efficient and Secure Communication in MU-MISO Networks", Digital Object Identifier, 10, 1109, Jun. 13, 2017, 9 pages, <https://ieeexplore.ieee.org/document/7979522>.

Zhou et al., "Deep Reinforcement Learning Coordinated Receiver Beamforming for Millimeter-Wave Train-ground Communications", Cornell University, arXiv:2205.10483v1, May 21, 2022, 15 pages, <https://arxiv.org/pdf/2205.10483.pdf>.

* cited by examiner

100

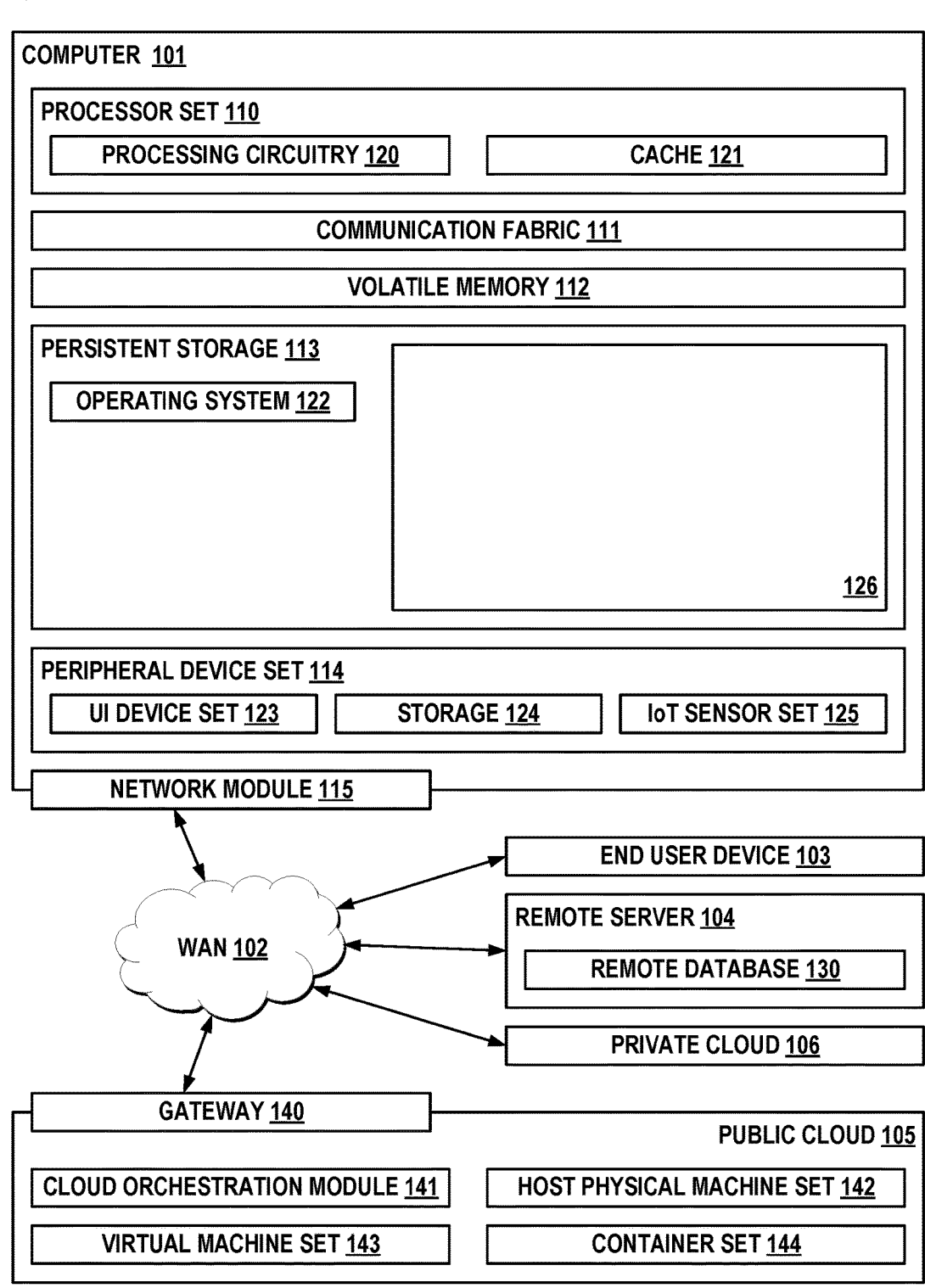

COMPUTER 101

PROCESSOR SET 110

PROCESSING CIRCUITRY 120          CACHE 121

COMMUNICATION FABRIC 111

VOLATILE MEMORY 112

PERSISTENT STORAGE 113

OPERATING SYSTEM 122

126

PERIPHERAL DEVICE SET 114

UI DEVICE SET 123          STORAGE 124          IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141          HOST PHYSICAL MACHINE SET 142

VIRTUAL MACHINE SET 143          CONTAINER SET 144

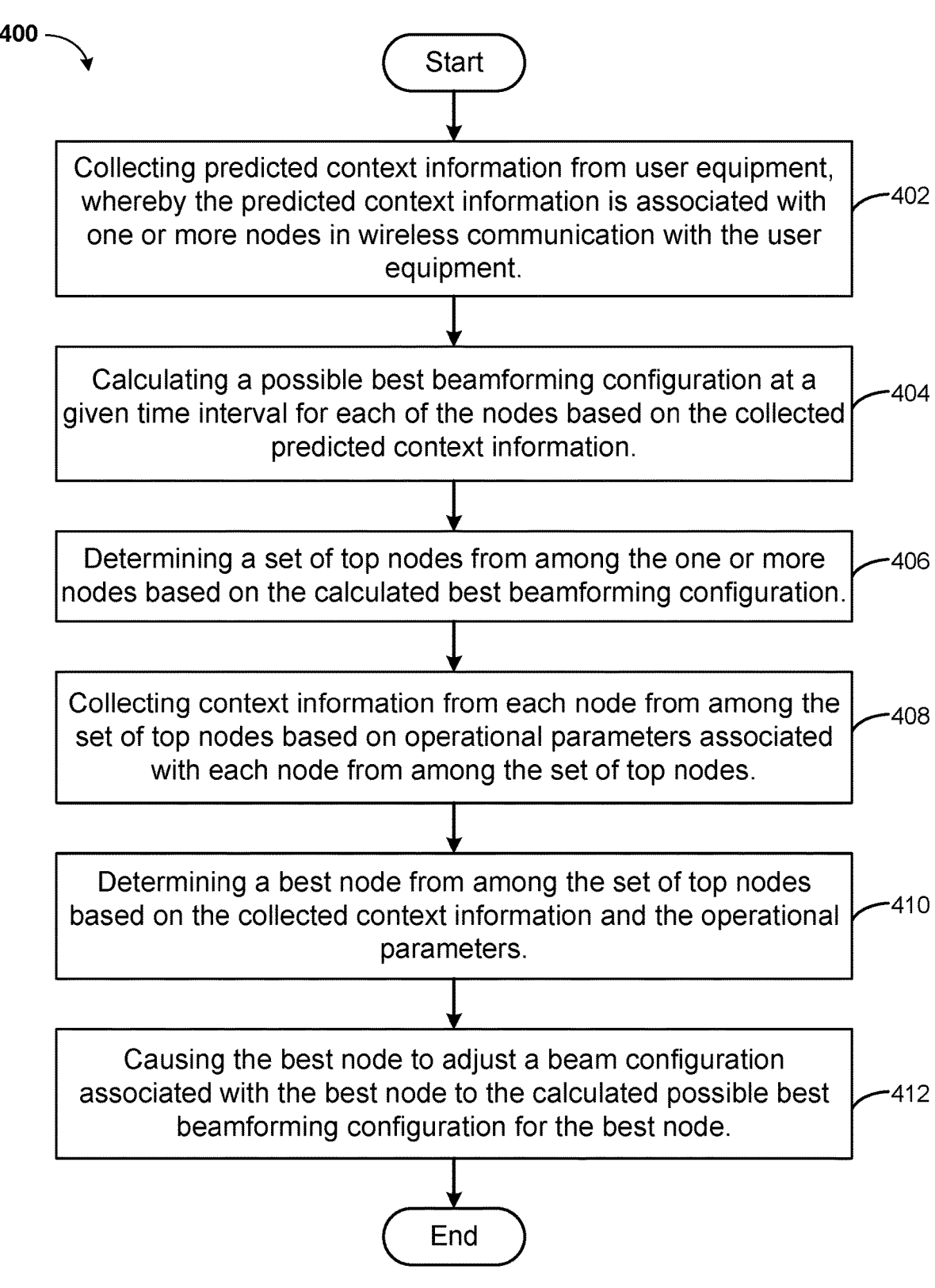

400

Start

Collecting predicted context information from user equipment, whereby the predicted context information is associated with one or more nodes in wireless communication with the user equipment. —402

Calculating a possible best beamforming configuration at a given time interval for each of the nodes based on the collected predicted context information. —404

Determining a set of top nodes from among the one or more nodes based on the calculated best beamforming configuration. —406

Collecting context information from each node from among the set of top nodes based on operational parameters associated with each node from among the set of top nodes. —408

Determining a best node from among the set of top nodes based on the collected context information and the operational parameters. —410

Causing the best node to adjust a beam configuration associated with the best node to the calculated possible best beamforming configuration for the best node. —412

End

FIG. 4

MULTI-OBJECTIVE OPTIMIZATION OF BEAMFORMING IN DISTRIBUTED EDGE-IOT ENVIRONMENTS

FIELD

This disclosure relates generally to the field of edge computing, and more particularly to beamforming in edge computing environments.

BACKGROUND

Beamforming is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity.

SUMMARY

Embodiments relate to a method, system, and computer program product for optimization of beamforming in distributed edge computing environments. According to one aspect, a method for optimization of beamforming in distributed edge computing environments is provided. The method may include collecting predicted context information is collected from user equipment. The predicted context information is associated with one or more nodes in wireless communication with the user equipment. A possible best beamforming configuration at a given time interval is calculated for each of the nodes based on the collected predicted context information. A set of top nodes is determined based on the calculated possible best beamforming configuration. Context information is collected from each node in the set of top nodes based on operational parameters associated with each node. A best node is determined from among the set of top nodes based on the collected context information and the operational parameters. A beamforming configuration associated with the best node is adjusted to the calculated possible best beamforming configuration.

According to another aspect, a computer system for optimization of beamforming in distributed edge computing environments is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include collecting predicted context information is collected from user equipment. The predicted context information is associated with one or more nodes in wireless communication with the user equipment. A possible best beamforming configuration at a given time interval is calculated for each of the nodes based on the collected predicted context information. A set of top nodes is determined based on the calculated possible best beamforming configuration. Context information is collected from each node in the set of top nodes based on operational parameters associated with each node. A best node is determined from among the set of top nodes based on the collected context information and the operational parameters. A beamforming configuration associated with the best node is adjusted to the calculated possible best beamforming configuration.

According to yet another aspect, a computer program product for optimization of beamforming in distributed edge computing environments is provided. The computer program product may include one or more computer-readable storage devices and program instructions stored on at least one of the one or more tangible storage devices, the program instructions executable by a processor. The program instructions are executable by a processor for performing a method that may accordingly include collecting predicted context information is collected from user equipment. The predicted context information is associated with one or more nodes in wireless communication with the user equipment. A possible best beamforming configuration at a given time interval is calculated for each of the nodes based on the collected predicted context information. A set of top nodes is determined based on the calculated possible best beamforming configuration. Context information is collected from each node in the set of top nodes based on operational parameters associated with each node. A best node is determined from among the set of top nodes based on the collected context information and the operational parameters. A beamforming configuration associated with the best node is adjusted to the calculated possible best beamforming configuration.

According to one or more aspects, the one or more nodes correspond to one or more base stations configured for multi-access edge computing, and the operational parameters correspond to energy cost and carbon dioxide emissions associated with operation of the base stations. This may allow for determination of environmental impacts that running the base station may have.

According to one or more aspects, the best node corresponds to a node from among the one or more nodes having a best beamforming configuration that minimizes the operational parameters. This may allow for increased operation efficiency of the base station.

According to one or more aspects, the context information is based on based on current and historical environmental data associated with the one or more nodes. This may allow for the determination of trends within the environmental data to assist in selecting the best base station for beamforming during a given time interval.

According to one or more aspects, the possible best beamforming configuration for a node from among the one or more nodes includes a power value and an angle of transmission of a beam transmitted from node. This may allow for adjustments to direction and intensity of the beam being formed to allow for changes in conditions in the area of the base station.

According to one or more aspects, the method may further include determining a different node from among the one or more nodes is a new best node for a new time interval and handing over beam transmission operations to the new best node. This may allow for operation of multiple base stations in the most efficient manner.

According to one or more aspects, handing over beam transmission operations to the new best node comprises providing information to the new best node including connection data, coordinates, and context information for the user equipment. This may allow for improved efficiency and wireless connection strength between the base station and the user equipment.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 illustrates a networked computer environment according to at least one embodiment;

FIG. 4 is an operational flowchart illustrating the steps carried out by a program that optimizes beamforming in distributed edge computing environments, according to at least one embodiment.

DETAILED DESCRIPTION

Figure 2:
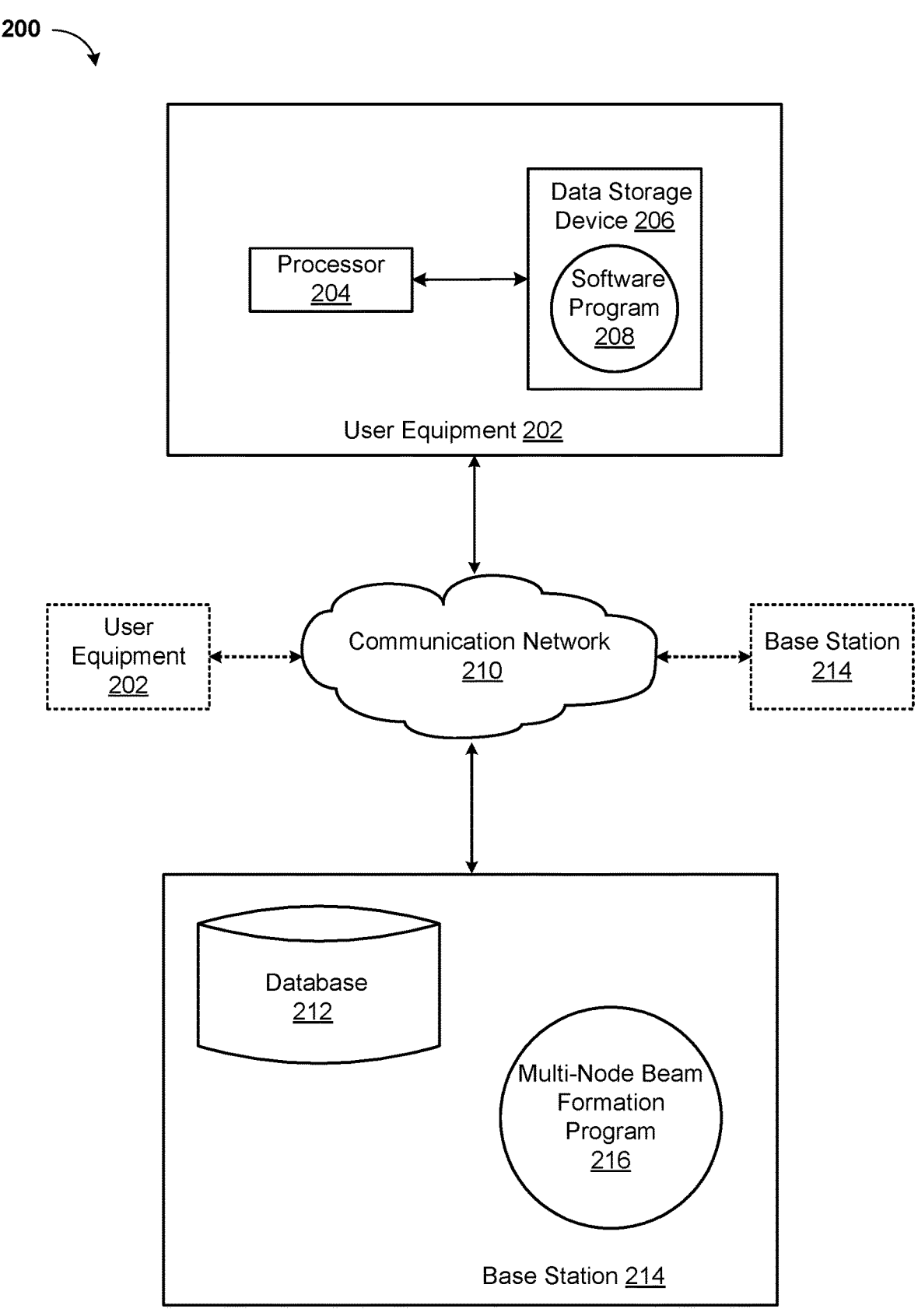
FIG. 2 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of edge computing, and more particularly to beamforming in wireless/cellular edge computing environments (e.g., 5G, 6G, Private WiFi, etc.). The following described exemplary embodiments provide a system, method, and computer program product to, among other things, optimize beamforming in distributed edge computing environments. Therefore, some embodiments have the capacity to improve the field of computing by improving the quality of service in edge computing environments and allowing for telecommunication towers in multi-node, multi-device scenarios to autonomously optimize beamforming, resulting in enhanced network performance, reduced infrastructure optimization efforts, and improved user experience.

As previously described, beamforming is a signal processing technique used in sensor arrays for directional signal transmission or reception. This is achieved by combining elements in an antenna array in such a way that signals at particular angles experience constructive interference while others experience destructive interference. Beamforming can be used at both the transmitting and receiving ends in order to achieve spatial selectivity. Beamforming may be governed by a scheduler in wireless environments, which may allocate the resources to user equipment, including beamforming parameters and time/frequency resources, among others.

Intelligent beamforming refers to the use of predefined algorithms or heuristics to adjust the beam formation based on certain criteria or rules. These algorithms typically consider factors such as signal strength, interference, and user demand to determine the optimal beamforming strategy. Intelligent beamforming techniques can be designed by experts in the field and rely on predefined rules or models. There is a need to automate and optimize the process of adjust beam formation in a telecommunication tower based on the presence and predicted movement of target objects and in coordination with other towers. The goal would be to optimize the beamforming strategy to maximize the signal strength and quality towards the target objects while minimizing interference and power consumption.

However, coordinating multiple nodes to provide the best communication beamforming pattern for one or more pieces of user equipment, such as a moving or stationary edge computing device, over time may be difficult. For example, questions arise as to how to optimize beam formation in multi-node and multi-device environments to ensure communication continuity and reduce infrastructure optimization, how to effectively adapt beamforming strategies in a distributed edge-IoT environment to account for the dynamic movement of IoT devices, and how to optimize beamforming to simultaneously maximize signal strength, minimize interference, and minimize power consumption in a multi-objective setting. Additionally, questions may arise as to how to incorporate reinforcement learning techniques to learn optimal beamforming policies in real-time based on interactions with the environment and how to handle limited and noisy data about the presence and movement of target objects in the beamforming optimization process.

The challenges revolve around dynamic and unpredictable environments, obtaining accurate and reliable data about the presence and movement of target objects, minimizing interference from other objects or users while optimizing beam formation, optimizing beamforming strategies while considering power consumption constraints, considerations on how to deploy beamforming strategies in large-scale distributed edge-IoT environments, and others.

It may be advantageous, therefore, to perform multi-objective optimization of beamforming in distributed edge-IoT environments by utilizing advanced machine learning algorithms, including reinforcement learning, to adaptively optimize beamforming strategies in real-time. The method, computer system, and computer program product disclosed herein may consider dynamic and unpredictable environments to effectively adjust beamforming patterns based on the presence and predicted movement of IoT devices and may addresses challenges related to data accuracy, interference mitigation, and power consumption constraints while aiming to maximize signal strength and communication continuity.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following described exemplary embodiments provide a system, method and computer program product that makes data-driven decisions for beamforming in an edge computing environment based on predicted future beamforming configurations, multi-objective considerations, and real-time orchestration. Referring now to FIG. 1, Computing environment 100 contains an example of an environment for the execution of at least some of the computer code involved in performing the inventive methods, such as Multi-Objective Optimization 126. In addition to Multi-Objective Optimization 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and Multi-Objective Optimization 126, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in Multi-Objective Optimization 126 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in Multi-Objective Optimization 126 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer 12oftwaree, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Referring now to FIG. 2, a functional block diagram of a networked computer environment illustrating a Multi-Objective Optimization system 200 (hereinafter "system") for optimization of beamforming in distributed edge computing environments over a wireless communications network. It should be appreciated that FIG. 2 provides only an illustration of one implementation and does not imply any limitations with regard to the environments in which different embodiments may be implemented. Many modifications to the depicted environments may be made based on design and implementation requirements.

The system 200 may include wireless terminal 202 and a server computer 214. The wireless terminal 202 may communicate with the server computer 214 via a communication network 210 (hereinafter "network"). The wireless terminal 202 may be an edge computing device include a processor 204 and a software program 208 that is stored on a data storage device 206 and is enabled to interface with a user and communicate with the server computer 214. The wireless terminal 202 may be, for example, a mobile device, a telephone, a personal digital assistant, a netbook, a laptop computer, a tablet computer, a desktop computer, or any type of computing devices capable of running a program, accessing a network, and accessing a database.

The server computer 214, which may be used for optimization of beamforming in distributed edge computing environments is enabled to run a Multi-Node Beam Formation Program 216 (hereinafter "program") that may interact with a database 212. Multi-node beam formation is explained in more detail below with respect to FIG. 4. In one embodiment, the wireless terminal 202 may operate as an input device including a user interface while the program 216 may run primarily on server computer 214. In an alternative embodiment, the program 216 may run primarily on one or more wireless terminals 202 while the server computer 214 may be used for processing and storage of data used by the program 216. It should be noted that the program 216 may be a standalone program or may be integrated into a larger program.

It should be noted, however, that processing for the program 216 may, in some instances, be shared amongst the wireless terminals 202 and the server computers 214 in any ratio. In another embodiment, the program 216 may operate on more than one computer, server computer, or some combination of computers and server computers, for example, a plurality of wireless terminals 202 communicating across the network 210 with a single server computer 214. In another embodiment, for example, the program 216 may operate on a plurality of server computers 214 communicating across the network 210 with a plurality of client computers. Alternatively, the program may operate on a network server communicating across the network with a server and a plurality of client computers.

The network 210 may include wireless connections. The network 210 may additionally include wired connections, fiber optic connections, or some combination thereof in conjunction with the wireless connections. In general, the network 210 can be any combination of connections and protocols that will support wireless or combined wired and wireless communications between the wireless terminal 202 and the server computer 214. The network 210 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a private network, an ad hoc network, an intranet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of system 200 may perform one or more functions described as being performed by another set of devices of system 200.

Figure 3:
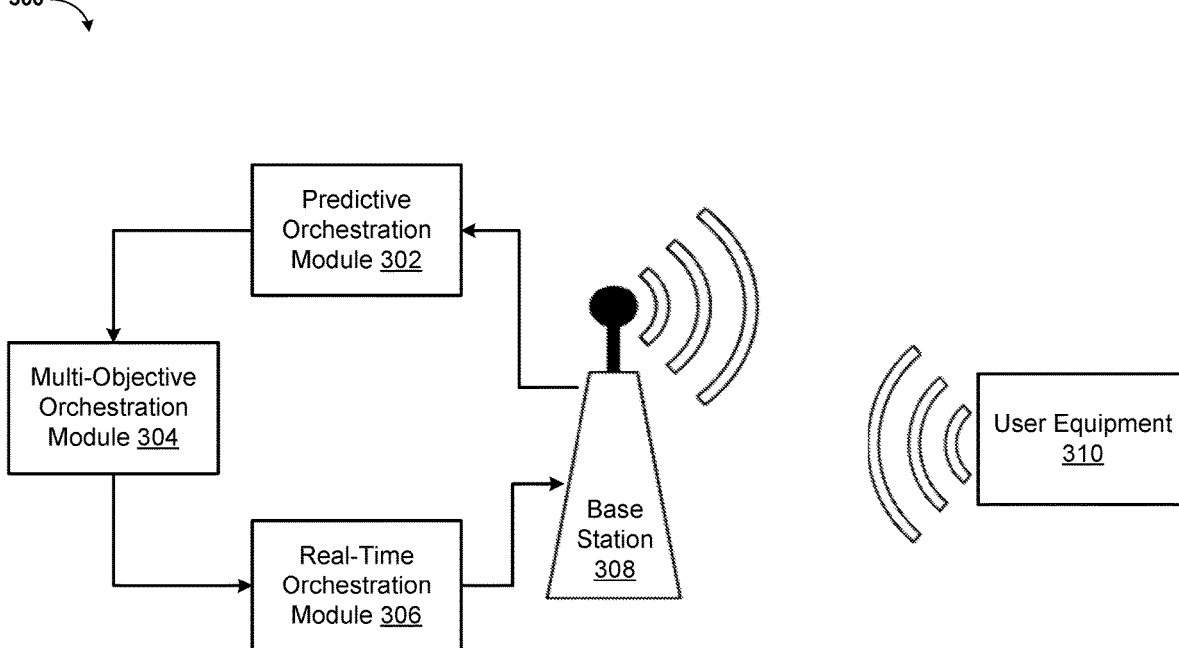
FIG. 3 is a block diagram of a system for optimization of beamforming in distributed edge computing environments, according to at least one embodiment.

Referring now to FIG. 3, a diagram of a multi-node beam formation system 300 is depicted according to one or more embodiments. The multi-node beam formation system 300 may include, among other things, a predictive orchestration module 302, a multi-objective orchestration module 304, a real-time orchestration module 306, one or more base stations 308, and user equipment 310. The base stations 308 may be computing nodes configured for multi-access edge computing in order to calculate beamforming parameters. For ease of illustration, only one base station 308 is depicted in FIG. 3. However, it may be appreciated that the multi-node beam formation system 300 may include any number of base stations 308.

The predictive orchestration module 302 may collect context information from the user equipment 310 and may predict future optimal beamforming configurations for each of the base stations 308 at a specific time point. Based on predefined rules, the predictive orchestration module 302 may calculate the best beamforming parameters, such as angle and power, to ensure efficient communication. The predictive orchestration module 302 may classify the best possible configurations for each of the base stations 308 and may generate the final optimal beamforming configuration for all of the base stations 308. Beamforming operations may integrate into the usual wireless flow and protocols, including, for example, a scheduler.

The predictive orchestration module 302 may collect context information from edge computing devices in a distributed edge-IoT environment and may extract relevant features from the data for predictive orchestration. The predictive orchestration module 302 may choose a predictive model (e.g., machine learning or time-series forecasting) for each node's future optimal beamforming configurations and define rule-based calculations to determine the best beamforming parameters based on expert knowledge and domain requirements. The predictive orchestration module 302 may combine predicted parameters with rule-based calculations to ensure efficient communication and network performance and classify the best possible configurations for each node considering multiple objectives (signal strength, interference, power consumption). The predictive orchestration module 302 may define objective functions representing goals for signal strength, interference, and power consumption; assign weights to each objective function based on its relative importance; and formulate the beamforming optimization as a multi-objective problem.

The predictive orchestration module 302 may use Pareto optimization or other multi-objective algorithms to explore the trade-off space. The predictive orchestration module 302 may identify the Pareto front, which may represent non-dominating optimal configurations, and may assign Pareto rankings based on dominance in the multi-objective space. The predictive orchestration module 302 may select configurations with lower Pareto ranks and aligned weights as the best possible configurations.

The predictive orchestration module 302 may form the final set of best configurations for each node based on multi-objective optimization results. This may ensure optimal communication performance while minimizing interference and conserving power resources. The predictive orchestration module 302 may generate the final optimal beamforming configuration for all nodes, optimizing globally for overall network performance and continuity, and may implement real-time orchestration that continuously updates beamforming configurations based on new context information. The predictive orchestration module 302 may incorporate feedback loops to periodically retrain the predictive model for adaptation to environmental changes and may integrate the model into the network infrastructure in order to test and validate accuracy and effectiveness.

The multi-objective orchestration module 304 may addresses the multi-objective nature of beamforming optimization by collecting contextual information about node operations, such as energy cost and CO2 emissions, and calculating the best deployment location for beamforming. The multi-objective orchestration module 304 may consider the top-N best nodes and node operation parameters and may filter the best node based on predefined rules. The multi-objective orchestration module 304, therefore, may find the optimal node and beamforming configuration that simultaneously satisfy multiple objectives, such as signal strength, energy efficiency, and environmental impact.

The multi-objective orchestration module 304 may collect contextual information about node operations, including energy cost, CO2 emissions, signal strength, interference levels, and power consumption. The multi-objective orchestration module 304 may continuously monitor network performance to re-optimize node-beamforming configurations as the environment changes and may consider real-time updates to objectives and weights based on evolving network requirements and operational conditions. The multi-objective orchestration module 304 may define objective functions for signal strength, energy efficiency, and environmental impact.

The multi-objective orchestration module 304 may create a signal strength objective function to quantify the quality and strength of the communication signal for each node (e.g., RSSI, SNR, throughput). The multi-objective orchestration module 304 may design an energy efficiency objective function to measure the energy consumption efficiency of each node's beamforming operations (e.g., power consumption, energy per bit) and develop an environmental impact objective function to assess the CO2 emissions associated with each node's beamforming operations (e.g., CO2 emissions per data packet).

The multi-objective orchestration module 304 may combine the individual objective functions into a single multi-objective formulation for simultaneous optimization and assign relative weights to each objective function based on their importance in the network optimization process. The multi-objective orchestration module 304 may formulate the objective functions as either maximization or minimization problems, depending on the network's optimization goals and may define the non-dominance criterion to identify optimal beamforming configurations that strike a balance between different objectives. The multi-objective orchestration module 304 may represent the objective functions using mathematical expressions or algorithms considering node parameters and contextual information and may evaluate beamforming configurations from various perspectives to identify strategies that meet multiple network goals while considering constraints and requirements in the distributed edge-IoT environment. For example, the multi-objective orchestration module 304 may assign weights to each objective function to reflect their relative importance in the optimization process and may determine the relative importance of each objective function based on network requirements and priorities before normalizing the weights to ensure they sum up to 1 or 100%.

The multi-objective orchestration module 304 may validate and refine the assigned weights by analyzing trade-offs between different objectives, considering potential conflicts or synergies, and conducting sensitivity analysis to evaluate the impact of varying weights on optimization results. The multi-objective orchestration module 304 may utilize decision-making techniques like Analytical Hierarchy Process (AHP) or weighted sum methods, refine the weights iteratively through discussions and evaluations with stakeholders, document the assigned weights and rationale behind the decisions made, and formulate the beamforming optimization as a multi-objective problem to seek optimal beamforming configurations that balance trade-offs between objectives.

The multi-objective orchestration module 304 may identify the top-N best nodes based on performance metrics and node operation parameters and may filter the node-beamforming configuration combinations based on predefined rules and constraints. The multi-objective orchestration module 304 may rank the filtered node-beamforming configurations based on overall performance scores and select the optimal node-beamforming configuration. The multi-objective orchestration module 304 may implement the selected node-beamforming configuration in the distributed edge-IoT environment.

The real-time orchestration module 306 may focus on real-time orchestration of beamforming in a multi-node environment by continuously assessing whether the current node is the best option for beamforming or if a handover to another node is necessary. If the current node is deemed optimal, the real-time orchestration module 306 may adjust the beam angle and power of the tower associated with the base station 308 accordingly. If not, the real-time orchestration module 306 may initiate a connection handover and may share relevant contextual information with the new node, ensuring a smooth transition of beamforming operations.

The real-time orchestration module 306 may evaluate the performance of neighboring nodes as potential candidates for beamforming and may determine whether the current node remains the best option or if a handover to another node is needed. The real-time orchestration module 306 may use predefined rules and criteria based on signal strength, interference levels, and energy efficiency for decision making. The real-time orchestration module 306 may adjust the tower's beam angle and power if the current node is deemed optimal or may initiate a connection handover to the newly identified optimal node if the current node is no longer the best option. The real-time orchestration module 306 may share relevant contextual information with the new node to facilitate a smooth transition of beamforming operations and may coordinate the handover process to minimize service disruption and maintain communication continuity.

The real-time orchestration module 306 may use machine learning or reinforcement learning techniques for real-time decision making and adaptation. The real-time orchestration module 306 may select suitable machine learning or reinforcement learning techniques for real-time decision making and adaptation (e.g., DQN, PPO, Q-Learning) and may train the learning model offline using historical data on beamforming configurations, network performance metrics, and contextual information. The real-time orchestration module 306 may deploy the trained model to make real-time decisions on beamforming configurations during ongoing operations.

The real-time orchestration module 306 may input current contextual information, node parameters, and network performance metrics to the model for decision making. The real-time orchestration module 306 may continuously update the model using new data collected during real-time operations to adapt to changes in the environment and network conditions. The real-time orchestration module 306 may define a reward system for reinforcement learning, in which the model receives positive or negative rewards based on the quality of its beamforming decisions. The real-time orchestration module 306 may balance exploration and exploitation to discover new strategies while exploiting known effective ones to achieve short-term goals and may continuously monitor the model's performance and periodically update its parameters or architecture to improve decision-making accuracy and adaptability.

Referring now to FIG. 4, an operational flowchart illustrating the steps of a method 400 carried out by a program that provides for optimization of beamforming in distributed edge computing environments is depicted. The method 400 may be described with the aid of the exemplary embodiments of FIGS. 1-3.

At 402, the method 400 may include collecting predicted context information from user equipment. The predicted context information is associated with one or more nodes in wireless communication with the user equipment. The context information is based on current and historical environmental data associated with the one or more nodes. In operation, the predictive orchestration module 302 (FIG. 3) may receive predicted context information generated by the user equipment 310 (FIG. 3).

At 404, the method 400 may include calculating a possible best beamforming configuration at a given time interval for each of the nodes based on the collected predicted context information. The possible best beamforming configuration for a node from among the one or more nodes includes a power value and an angle of transmission of a beam transmitted from node. In operation, the predictive orchestration module 302 (FIG. 3) may determine a power value and a beam angle for the base station 308 (FIG. 3) to communicate with the user equipment 310 (FIG. 3).

At 406, the method 400 may include determining a set of top nodes from among the one or more nodes based on the calculated possible best beamforming configuration. The top-N nodes may be considered based on predicted operation and communications signal strength between the base station and the user equipment. In operation, the multi-objective orchestration module 304 (FIG. 3) may determine which base station 308 (FIG. 3) from among a plurality of base stations 308 is best suited for communication with the user equipment 310 (FIG. 3).

At 408, the method 400 may include collecting context information from each node from among the set of top nodes based on operational parameters associated with each node from among the set of top nodes. The operational parameters correspond to energy cost and carbon dioxide emissions. In operation, the real-time orchestration module 306 (FIG. 3) may collect context information from the base station 308 (FIG. 3) and the user equipment 310 (FIG. 3) for determining the operational efficiency of the base station 308 and the user equipment 310.

At 410, the method 400 may include determining a best node from among the set of top nodes based on the collected context information and the operational parameters. The best node corresponds to a node from among the one or more nodes having a best beamforming configuration that minimizes the operational parameters. In operation, the real-time orchestration module 306 (FIG. 3) may determine a set of N best base stations 308 (FIG. 3) for communication with the user equipment 310 (FIG. 3).

At 412, the method 400 may include causing the best node to adjust a beamforming configuration associated with the best node to the calculated possible best beamforming configuration for the best node. If a different node from among the one or more nodes is determined to be a new best node for a new time interval, operations are handed over to the new best node. Handing over operations to the new best node comprises providing information to the new best node including connection data, coordinates, and context information for the user equipment. In operation, the real-time orchestration module 306 (FIG. 3) may cause a current base station 308 (FIG. 3) to hand over operation to a new base station 308 that may be able to have stronger, more efficient communications with the user equipment 310 (FIG. 3).

It may be appreciated that FIG. 4 provides only an illustration of one implementation and does not imply any limitations with regard to how different embodiments may be implemented. Many modifications to the depicted environments may be made based on design and implementation requirements.

Some embodiments may relate to a system, a method, and/or a computer program product at any possible technical detail level of integration. The computer program product may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer program product may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of optimization of beamforming in distributed edge computing environments, executable by a processor, comprising:

collecting predicted context information from user equipment, wherein the predicted context information is associated with one or more nodes in wireless communication with the user equipment;

calculating a possible best beamforming configuration at a given time interval for each of the one or more nodes based on the collected predicted context information;

determining a set of top nodes from among the one or more nodes based on the calculated possible best beamforming configuration;

collecting context information from each node from among the set of top nodes based on operational parameters associated with each node from among the set of top nodes;

determining a best node from among the set of top nodes based on the collected context information and the operational parameters; and causing the best node to adjust a beamforming configuration associated with the best node to the calculated possible best beamforming configuration for the best node.

2. The method of claim 1, wherein the one or more nodes correspond to one or more base stations configured for multi-access edge computing, and wherein the operational parameters correspond to energy cost and carbon dioxide emissions associated with operation of the base stations.

3. The method of claim 2, wherein the best node corresponds to a node from among the one or more nodes having a best beamforming configuration that minimizes the operational parameters.

4. The method of claim 1, wherein the context information is based on current and historical environmental data associated with the one or more nodes.

5. The method of claim 1, wherein the possible best beamforming configuration for a node from among the one or more nodes includes a power value and an angle of transmission of a beam transmitted from the node.

6. The method of claim 1, further comprising:

determining a different node from among the one or more nodes is a new best node for a new time interval; and handing over beam transmission operations to the new best node.

7. The method of claim 6, wherein handing over beam transmission operations to the new best node comprises providing information to the new best node including connection data, coordinates, and context information for the user equipment.

8. A computer system for optimization of beamforming in distributed edge computing environments, the computer system comprising:

one or more computer-readable storage media configured to store computer program code; and one or more computer processors configured to access said computer program code and operate as instructed by said computer program code, said computer program code including:

first collecting code configured to cause the one or more computer processors to collect predicted context information from user equipment, wherein the predicted context information is associated with one or more nodes in wireless communication with the user equipment;

calculating code configured to cause the one or more computer processors to calculate a possible best beamforming configuration at a given time interval for each of the one or more nodes based on the collected predicted context information;

first determining code configured to cause the one or more computer processors to determine a set of top nodes from among the one or more nodes based on the calculated possible best beamforming configuration;

second collecting code configured to cause the one or more computer processors to collect context information from each node from among the set of top nodes based on operational parameters associated with each node from among the set of top nodes;

second determining code configured to cause the one or more computer processors to determine a best node from among the set of top nodes based on the collected context information and the operational parameters; and adjusting code configured to cause the one or more computer processors to cause the best node to adjust a beamforming configuration associated with the best node to the calculated possible best beamforming configuration for the best node.

9. The computer system of claim 8, wherein the one or more nodes correspond to one or more base stations configured for multi-access edge computing, and wherein the operational parameters correspond to energy cost and carbon dioxide emissions associated with operation of the base stations.

10. The computer system of claim 9, wherein the best node corresponds to a node from among the one or more nodes having a best beamforming configuration that minimizes the operational parameters.

11. The computer system of claim 8, wherein the context information is based on current and historical environmental data associated with the one or more nodes.

12. The computer system of claim 8, wherein the possible best beamforming configuration for a node from among the one or more nodes includes a power value and an angle of transmission of a beam transmitted from the node.

13. The computer system of claim 8, wherein the program code stored on the one or more computer-readable storage media further comprises:

third determining code configured to cause the one or more computer processors to determine a different node from among the one or more nodes is a new best node for a new time interval; and handing code configured to cause the one or more computer processors to hand over beam transmission operations to the new best node.

14. The computer system of claim 13, wherein handing over beam transmission operations to the new best node comprises providing information to the new best node including connection data, coordinates, and context information for the user equipment.

15. A computer program product for optimization of beamforming in distributed edge computing environments, comprising:

one or more computer-readable storage devices; and program instructions stored on at least one of the one or more computer-readable storage devices, the program instructions configured to cause one or more computer processors to:

collect predicted context information from user equipment, wherein the predicted context information is associated with one or more nodes in wireless communication with the user equipment;

calculate a possible best beamforming configuration at a given time interval for each of the one or more nodes based on the collected predicted context information;

determine a set of top nodes from among the one or more nodes based on the calculated possible best beamforming configuration;

collect context information from each node from among the set of top nodes based on operational parameters associated with each node from among the set of top nodes;

determine a best node from among the set of top nodes based on the collected context information and the operational parameters; and cause the best node to adjust a beamforming configuration associated with the best node to the calculated possible best beamforming configuration for the best node.

16. The computer program product of claim 15, wherein the one or more nodes correspond to one or more base stations configured for multi-access edge computing, and wherein the operational parameters correspond to energy cost and carbon dioxide emissions associated with operation of the base stations.

17. The computer program product of claim 16, wherein the best node corresponds to a node from among the one or more nodes having a best beamforming configuration that minimizes the operational parameters.

18. The computer program product of claim 15, wherein the context information is based on current and historical environmental data associated with the one or more nodes.

19. The computer program product of claim 15, wherein the possible best beamforming configuration for a node from among the one or more nodes includes a power value and an angle of transmission of a beam transmitted from the node.

20. The computer program product of claim 15, wherein the program instructions stored on the at least one of the one or more computer-readable storage devices is further configured to cause one or more computer processors to:

determine a different node from among the one or more nodes is a new best node for a new time interval; and hand over beam transmission operations to the new best node.

* * * * *